United States Patent [19]

Noble

[11] Patent Number: 4,907,860
[45] Date of Patent: Mar. 13, 1990

[54] THREE DIMENSIONAL VIEWING GLASSES

[76] Inventor: Lowell A. Noble, 18138 Bancroft Ave., Monte Serreno, Calif. 95030

[21] Appl. No.: 163,856

[22] Filed: Mar. 3, 1988

[51] Int. Cl.$^4$ .................. G02F 1/133; G02C 1/00; A61B 3/00; H04N 13/00
[52] U.S. Cl. .................. 350/334; 350/331 R; 351/41; 351/158; 351/203; 358/88; 358/92
[58] Field of Search .................. 350/332, 331 R, 334, 350/337; 351/203, 41, 158; 358/88, 92

[56] References Cited

U.S. PATENT DOCUMENTS

| | | | |
|---|---|---|---|
| 3,737,567 | 6/1973 | Kratomi | 358/92 |
| 4,393,400 | 7/1983 | Ikushima et al. | 358/92 |
| 4,424,529 | 1/1984 | Roese et al. | 358/92 |
| 4,562,463 | 12/1985 | Lipton | 358/88 |
| 4,613,207 | 9/1986 | Fergason | 350/331 R |
| 4,698,668 | 10/1987 | Milgram | 350/332 |

Primary Examiner—Stanley D. Miller
Assistant Examiner—Anita E. Pellman
Attorney, Agent, or Firm—Thomas M. Freiburger

[57] ABSTRACT

For three-dimensional viewing of television and movies, in the format wherein left-eye and right-eye images are presented alternately on the screen, a pair of 3-D viewing glasses have correspondingly alternating on-/off left and right lenses. The lenses each contain liquid crystal material which varies from a nearly totally obscured state by scattering, to nearly 100% transmission, as controlled by a signal from the television or movie projector. In this way, in instances when the left-eye image is presented on the screen, the left-eye lens is "ON" so that the viewer sees the image with his left eye, and when the right-eye image is presented on the screen, the right-eye lens is "ON" to enable the viewer to see that image with his right eye. The two images on the screen are taken from different photographic angles, and the images alternate at a sufficient frequency for the viewer to perceive that both images are occurring at once, and he sees them as a composite three-dimensional image.

4 Claims, 1 Drawing Sheet

THREE DIMENSIONAL VIEWING GLASSES

BACKGROUND OF THE INVENTION

Three-dimensional films and television have been well-known, in several different forms. Three-dimensional films have been produced wherein two images are simultaneously projected onto a screen, each image having been photographed from a different angle, and each image being accented for either red or green. The viewer in this system wore glasses having one lens of red and the other of green, so that the images on the screen were filtered appropriately by each lens so that effectively the left eye saw only one image and the right eye saw only the other image, producing the three-dimensional effect.

The described system had one problem in that the composite image tended to be somewhat dark when viewed through the colored lenses. Another problem was in achieving the proper color balance in the composite image, which was often difficult.

Another system which has been used more recently employs time division in the displaying of two different images, one for the left eye and one for the right eye. Thus, the left-eye image is presented for a brief period, then the right-eye image is presented for a similar brief period, substantially without overlap of the two images in time.

Glasses for viewing the three-dimensional system just described, for either movies or television, have generally utilized polarization of the two lenses having liquid crystal material, on a time-alternating basis, as a means for causing each eye to see only its intended image. Most systems have used double polarization in each lens, which is sufficient to block out nearly 100% of the light from the opposite-eye image. Approximately 25% of the light from an image is received through the lens in the "ON" state.

The polarized-lens system suffered from a severe loss of brightness to the viewer. The perceived composite three-dimensional image was so dark as to be uncomfortable in viewing. In addition, the repeated strong contrast between total darkness and even 25% brightness caused additional discomfort to the eyes.

Another disadvantage of the system just described is that it required wires leading from the television or film projector to each pair of glasses, for transmitting the control signal for regulating the "ON" and "OFF" condition of each lens.

It is among the objects of the present invention to improve the visibility, comfort and convenience of use in a time-divided, alternate-image three-dimensional viewing system.

SUMMARY OF THE INVENTION

In accordance with the present invention, a pair of glasses for use with a time-division, alternating-image three-dimensional viewing system utilizes a liquid crystal material in each of a pair of lenses. A signal is sent from the television or projection system separately to each lens, alternately changing the state of the two liquid crystal lenses in an appropriate manner to present a composite three-dimensional image to the user. The change of state of the liquid crystal material is powered by an electrostatic field controlled by the signal.

When the liquid crystal material of a lens is in the "ON" state, nearly 100% of the light from the image is received by the viewer's eye. In the "OFF" state, the light striking the lens is scattered and the image is nearly totally obscured. The eye behind the "OFF" lens sees essentially a white or gray cloudiness.

The control signal to each of the lenses may be sent over wires extending from the television or projection system to the glasses, but more preferably a remote signal transmission is used, whereby the viewer, or a number of viewers, can be at any position within a given range of the screen and can move about freely without hindrance from wires or cables.

Such a remote system may be an infrared pulsing system such as has been used on remote headphone systems. Its function in conjunction with the present invention is simpler in that the infrared signals have only to control the "ON/OFF" state of each of two lenses, and the lenses of all viewers are controlled simultaneously.

The liquid crystal scattering material controlling the state of each lens of the glasses preferably comprises a commercially available material wherein a multiplicity of very fine spherical droplets of liquid crystal material are encapsulated within a latex material which is applied to the inner surface of at least one of the transparent sheets forming the lens. The clear latex when dried encapsulates the large multiplicity of spherical liquid crystal droplets. They are thus interposed between the viewer's eye and the image to be viewed on the screen.

The liquid crystal laminate, in an ordinary state wherein no energy is applied, scatters light and appears milky and translucent. A lens in this state therefore obscures and blocks out vision, appearing substantially opaque to the eye, in the sense of the eye's not being able to discern any shape or form through the lens. However, when an electrostatic field is applied between the two plastic layers on either side of the liquid crystal droplets, the liquid crystals align with the direction of view, and the lens becomes substantially transparent, for the "ON" state of the lens.

With the three-dimensional viewing glasses of the present invention, considerably more light passes through the lenses in comparison with prior art red-/green and alternately polarized lenses. The screen appears much brighter to the viewer.

Since the amount of light entering the eye is about the same in the "ON" and "OFF" conditions, the amount of flicker perceived by the viewer is reduced over the amount perceived when the light entering the eye is first "ON" and full black.

It is therefore a principal object of the invention to provide improved time-divided three-dimensional viewing glasses for three-dimensional time-divided systems, wherein the three-dimensional image is much brighter to the viewer than in prior glasses, considerably more comfortable to view, with less flicker, and wherein the glasses are of relatively simple and inexpensive construction. It is also an object in one aspect of the invention to eliminate wires leading from the three-dimensional system to the viewing glasses, by using a remote signal control system for the glasses. These and other objects, advantages, features and characteristics of the invention will be apparent from the following description of a preferred embodiment, considered along with the accompanying drawings.

DESCRIPTION OF PREFERRED EMBODIMENTS

Figure 1:
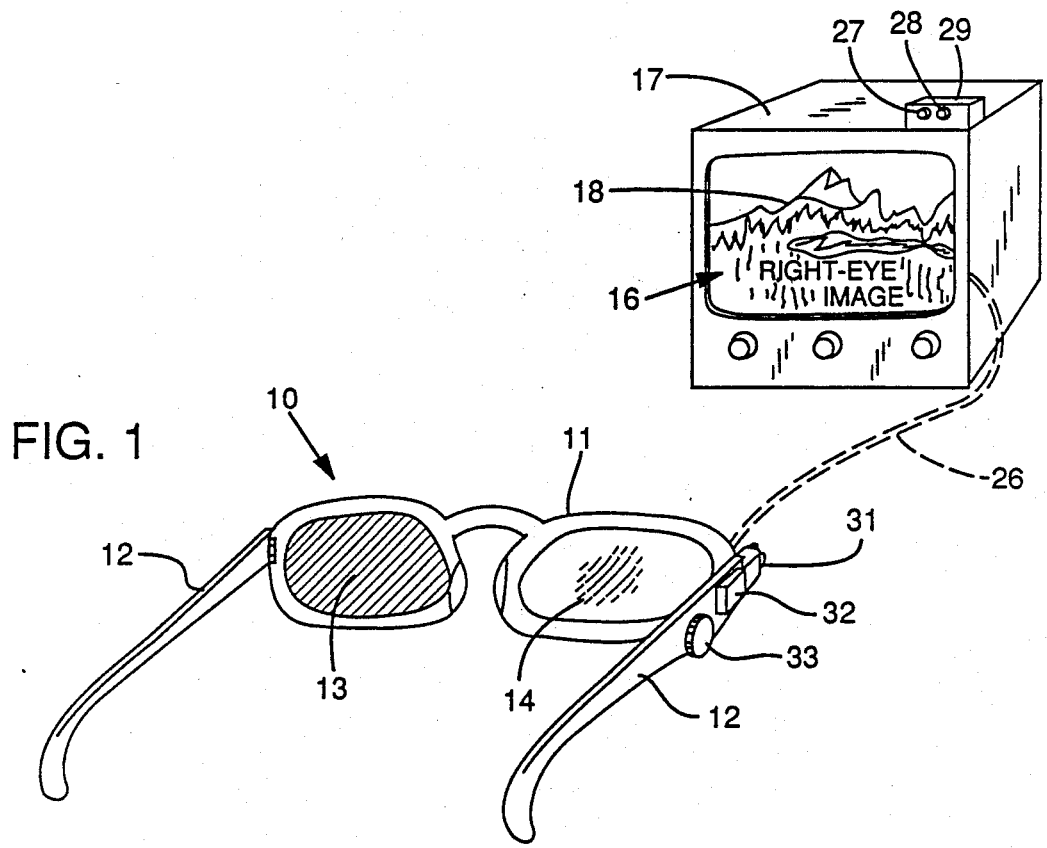
FIG. 1 is a perspective view showing a pair of three-dimensional viewing glasses in accordance with one embodiment of the invention with a television viewing screen shown in position to be observed through the glasses.

In the drawings, FIG. 1 shows a pair of three-dimensional viewing glasses 10 according to one embodiment of the invention. The glasses 10 include frames 11, temples 12, a left lens 13 and a right lens 14.

The three-dimensional viewing glasses 10 in FIG. 1 are shown oriented for a user's viewing the screen 16 of a television or video monitor 17, but this could also be a film projection screen. The video screen 16 is shown displaying an image 18 which, as illustrated in FIG. 1, may be a right-eye image. This is viewed by the user through the right lens 14 of the glasses. At the time the right lens 14 is clear to transmit the image 18 to the viewer, i.e. in an "ON" state, the left lens 13 is obscured, in an "OFF" state, so that the viewer's left eye is unable to see the right-eye image 18 on the screen 16. The right-eye image 18 is displayed for a fraction of a second (which may be 1/60 second as explained below), then the screen 16 displays a left-eye image (not shown in the drawing). When the monitor changes from the right-eye image 18 to the left-eye image, the left lens 13 becomes clear and transparent while the right lens 14 becomes cloudy or obscured, so that the user is unable to see the displayed image through that eye. The lens becomes "opaque" in the sense that the user is unable to view any image or any lines or contrast, although the lens still passes scattered light through to the eye.

Previous three-dimensional time-divided viewing systems have functioned generally in accordance with what has just been described. However, such previous time-divided systems utilized alternating polarization of each of the lenses, normally double polarization, controlled by a signal input. Such glasses would block substantially all light through a lens in the "OFF" state, so that the lens appeared nearly black, but in the "ON" state the lens would only pass about 25% of the light. Thus, not only was there a very sharp contrast between the two states, i.e. substantially totally dark to 25% light, but the composite picture also appeared quite dark to the viewer.

Figure 2:
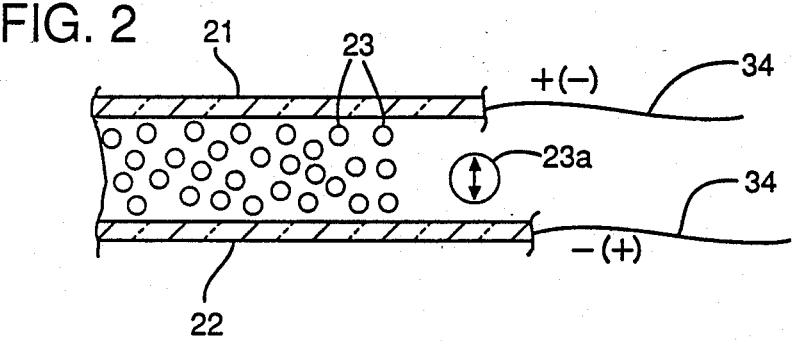
FIG. 2 is a somewhat schematic partial sectional view indicating a preferred construction for each of the lenses of the viewing glasses.

In accordance with this invention, there is a substantial increase in comfort to the user's eyes as well as in the brightness level seen by the user. The left and right lenses 13 and 14 are formed from a liquid crystal laminate material, preferably a "vanilla" material as manufactured by Taliq Corporation of San Jose, California. This laminate material, which may be formed into curves for glasses which wrap around the side of the eyes, is indicated schematically in FIG. 2. As shown in FIG. 2, the material comprises a pair of transparent sheets 21 and 22 between which there are sandwiched a mass of discrete tiny droplets or spheres 23 of liquid crystal material. The properties of the liquid crystal material 23 change with fluctuations in the signal applied to the exterior sheets of transparent material 21 and 22. The signal is an electric charge placed across the two sheets 21 and 22, creating an electrostatic field between the two sheets, affecting the orientation of the liquid crystals within each liquid crystal sphere 23. If the electrostatic field is present, i.e. the electric charge or potential is applied to the two sheets of material 21 and 22, the liquid crystals within each sphere 23 become oriented in a direction perpendicular to the planes of the two sheets, i.e. parallel to the direction of view and to the light rays passing through the lens. This causes the lens to become transparent, or substantially transparent to the extent of about 98% transparency.

However, when the electric charge and the electrostatic field are released, the liquid crystals within each sphere adopt curving orientations by the influence of the shape of the tiny spheres 23 within which they reside. This causes scatter of light, with the effect that the lens then appears milky and substantially totally obscured. Since the light is merely scattered and not blocked, the lens still appears light to the viewer's eye, essentially about the same brightness as when the lens is in the transparent "ON" state. The result of this is greatly increased comfort to the user's eyes. By eliminating sharp and rapid, large fluctuations in brightness seen by the eye, the glasses of the invention avoid the constant bombardment of the eye with signals which would dictate a response by the iris to accommodate the brightness change. Thus, the discomfort and even occasional headache pain encountered by users of the prior art systems are avoided.

The product described, manufactured by Taliq Corporation for use in the lenses 13 and 14, is prepared by coating a wet, blended frothy mixture of liquid crystal material in a watery latex base onto a layer of clear transparent material such as the layer 21 or 22 shown in FIG. 2. Normally the base layer is of transparent polyethylene, polyacrlic, or polycarbonate pastic, but it can be glass. The transparent material is coated with a transparent conductive coating, usually tin or indium chloride.

Varying amounts of black pigment material may be added to the frothy mixture in producing the glasses of the invention. The black material reduces the transmission directly through the lenses by 2% to 5%, in both "ON" and "OFF" modes. However, it causes scattered light perpendicular to the line of sight to be heavily absorbed by up to 90% to 95%. This increases appreciably the contrast ratio of the picture being viewed while the lens is in the "ON" transmission state, while reducing somewhat the brightness of the lens in the foggy translucent "OFF" state.

The liquid crystal coating may be about 20 microns thick. The liquid crystal mixture layer is allowed to dry, and as the water evaporates out of the mixture, tiny droplets of liquid crystal suspended in the mixture are encapsulated within transparent latex and are frozen in place as tiny spheres Inside each droplet or sphere 23, bonding occurs between cells, with the bonded structure following generally the shape of the droplet, i.e. curving. In the absence of an electrostatic field, the curving structure prevails and causes the liquid crystals to scatter light, as described above.

However, when the electrostatic field is applied, the liquid crystals are caused to align with the field, along the line of sight of the viewer, and thus the laminate material becomes up to about 98% transparent. In accordance with the invention, this alteration of state is accomplished in 3 milliseconds or less.

As in the prior double polarized lens type 3-D viewing glasses, the 3-D viewing glasses 10 of the invention may be controlled by wires 26 shown in dashed lines in FIG. 1 extending from the TV monitor 17 (or projection system or other component in the three-dimensional viewing system) to the frames 11 of the glasses and through the frames to the lenses 13 and 14 themselves. The wires 26 carry a signal with timing the alternating state of each lens in synchronization of the alternating appearance of the right-eye image and left-eye image on the screen 16. The form of the signal may be a simple voltage sent to the lenses 13 and 14 to create the potential between the two faces of material 21 and 22 and thus the electrostatic field. A voltage is sent to the right lens for a brief period, then to the left lens for a similar brief period, then to the right lens and so on. For video, the duration of each "ON" or "OFF" state of each lens is 1/60 second so that the composite three-dimensional image is seen by the viewer every 1/30 second.

Interleaving of images as normally practiced in television is not used with time-divided three-dimensional viewing systems such as in the prior polarized lens systems, and this is also the case with systems for which the viewing glasses 10 of the present invention are used. An image for one eye, e.g. the right-eye will be scanned for 1/60 second, followed by the scanning of the left-eye image for 1/60 second, then a succeeding left-eye image for the next 1/60 second, and so on. Since the image traced by conventional television in 1/60 second is actually a half image (lines 1, 3, 5, 7, 9, etc.), it is actually this type of half-image that is generated for each eye in each 1/60 second.

One important feature of the present invention is that the lead wires 26 to the viewing glasses 10 may be eliminated and replaced with a remote synchronization signaling system. Such a system may be generally of the type used for remote wireless earphones for stereo sound reproduction, as manufactured for example by NADY Systems under the product designations IRT-200 (infrared transmitter) and IRD-200 (infrared detector).

The remote synchronization signalling system may transmit infrared, ultrasonic or FM pulses, which change every 1/60 second in this preferred embodiment. An infrared system is described herein.

In accordance with the present invention, the infrared remote synchronization signaling system is quite simple, and may include only one or two infrared transmitter outputs 27 and 28 on an infrared transmitter 29 shown on the television monitor 17 in FIG. 1. The transmitter outputs 27 and 28 may send signals for each respective lens 13 and 14, controlling the "ON" and "OFF" state of each lens. Preferably, the signal from each output is in the form of an alternating signal at a frequency of 60 Hz. This is illustrated in the schematic graphic representation of FIG. 3.

The infrared signals from the transmitter 29 at 60 Hz are picked up by an infrared sensor or receiver 31 on the viewing glasses 10, such as on the temple 12 as shown. The signals, which may be in the form of square wave pulsations, are received in the infrared sensor 31 and converted in a converter 32, connected to an onboard battery 33, into a pulsating electric current at some multiple of the receiving frequency. The higher-frequency signal is delivered through leads 34 (FIG. 2) to the sheets 21 and 22 of transparent material.

The pulsating electrical current (which may be at 360 Hz as in FIG. 3) thus creates the electrical potential across the two sheets 21 and 22 and the resulting pulsating electrostatic field, for the duration of each signal pulse coming from the infrared transmitter 29. The alternating electrostatic field keeps the liquid crystals of each encapsulating sphere oriented in the line of view. Direct current would tend to draw them to one side of the sphere and into non-alignment.

Figure 3:
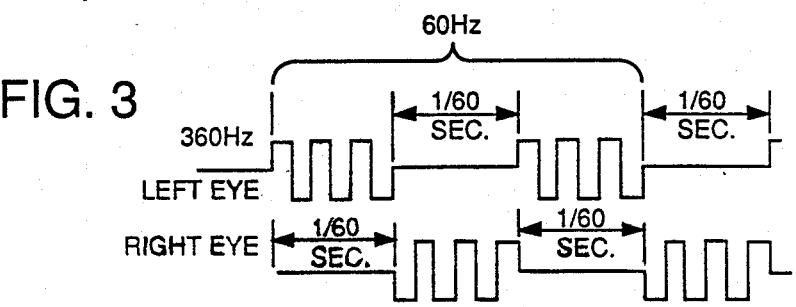
FIG. 3 is a schematic graphic representation indicating a control signal used to control the "ON" and "OFF" state of each of the lenses of the glasses.

As illustrated in FIG. 3, each synchronization signal pulse is maintained for 1/60 second, during which six spikes occur at 360 Hz, for the described embodiment. Following this 1/60 second period, taking the left eye as in FIG. 3, there is then a 1/60 second period where no signal is sent to that lens, followed by a further 1/60 second period in which another pulse of six spikes occurs. This is in synchronization with the appearances of the left-eye image on the screen 16.

Meanwhile, the right-eye image signal pulses occur similarly, but in opposite timing to the left-eye signals, as illustrated in FIG. 3. In this way, the three-dimensional viewing glasses 10 operate in synchronization with the appearance of the right- and left-eye images on the screen 16, without the need for restrictive lead wires 26 between the glasses and the monitor.

The system may also operate at higher frequencies such as 90 Hz or 120 Hz to minimize flicker. For example, there can be two "ON" states per eye while the image for that eye is on the screen (and while the lens for the other is eye is "OFF"). This helps reduce the appearance of flicker.

The onboard battery 33 on the viewing glasses 10 may comprise a small battery of the type used in hearing aids, and it may produce 60 volts, or be transformed to 60 volts. The converter 32 for producing the pulses of alternating current to each of the lenses 13 and 14 may be an integrated circuit which produces an output at 360 Hz.

With the three-dimensional viewing glasses and remote signaling system of the invention, three-dimensional viewing is greatly improved in brightness and in comfort to the user, as well as in convenience and freedom of movement during use, as compared to previous systems. The system of the invention is quite simple and economical to produce, while still fitting within the format of conventional time-divided three-dimensional viewing systems.

The preferred embodiments described above are intended to illustrate the principles of the invention, but not to limit its scope. Other embodiments and variations to this preferred embodiment will be apparent to those skilled in the art and may be made without departing from the scope of the invention as defined in the following claims.

I claim:

1. A pair of three-dimensional viewing glasses for viewing a screen with separate right-eye and left-eye images presented in a time-divided three-dimensional system wherein the right-eye image and the left-eye image alternate on the screen, comprising:

a right lens and a left lens, each lens comprising a laminate with liquid crystal means between two layers of clear sheet material for obscuring vision through that lens in an "OFF" state and for providing clear view through the lens in an "ON" state in response to receipt of a control signal, a pair of frames for supporting the lenses, signal conducting means for carrying a control signal from the three-dimensional system to the liquid crystal means of each lens, to control the alternating state of each lens, the liquid crystal means comprising a large number of droplets of liquid crystal material encapsulated in transparent latex material and sandwiched between two layers of clear sheet material, and including means responsive to receipt of the control signal for establishing an electrostatic field between the two sheet material layers in the "ON" state, effective to align liquid crystals in the droplets substantially with the direction in which the light from the image travels through the lens, and the latex material having added to it a dark pigment, for improving the contrast ratio of what is viewed in the "ON" condition by absorbing light scattered transversely to the line of sight in the "ON" state, whereby dark sections of the screen are made to appear darker.

2. A method for three-dimensional viewing of a screen with separate right-eye and left-eye images presented in a time-divided three-dimensional system wherein the right-eye image and the left-eye alternate on the screen, comprising:

viewing the screen through a right lens and a left lens, each lens comprising a laminate with liquid crystal means between two layers of clear sheet material for obscuring vision through that lens in an "OFF" state and for providing clear view through the lens in an "ON" state in response to receipt of a control signal, with a pair of frames supporting the lenses, said liquid crystal means comprising a large number of droplets of liquid crystal material encapsulated in transparent latex material and sandwiched between two layers of clear sheet material, the liquid crystal means further including a dark pigment added to the transparent latex material, in an amount effective to absorb scattered light perpendicular to the line of sight through the lens so as to appreciably increase contrast ratio in the "ON" state, while reducing transmissivity slightly in both the "ON" state and the "OFF" state, generating a control signal in the three-dimensional system, corresponding to and alternating in synchronization with occurrence of the right-eye image and the left-eye image on the screen, and sending the control signal from the three-dimensional system to the liquid crystal means of each lens, to control the alternating state of each lens by establishing an electrostatic field between the two clear sheet layers in the "ON" state, in response to receipt of the control signal at the lenses, effective to align liquid crystals in the droplets substantially with the direction in which the light from the image travels through the lens.

3. The method of claim 2, wherein the dark pigment is added in an amount effective to reduce direct light transmission through the lenses by about 2% to 5%.

4. A method for producing a pair of three-dimensional viewing glasses for viewing a screen with separate right-eye and left-eye images presented in a time-divided three-dimensional system wherein the right-eye image and the left-eye image alternate on the screen, comprising:

producing similar right and left lenses by first encapsulating a multiplicity of droplets of liquid crystal material in a transparent latex material, and adding a dark pigment to the transparent latex material to absorb light scattered transversely to the line of sight in the "ON" state, for improving the contrast ratio of what is viewed in the "ON" state, then sandwiching the liquid crystal/latex material between two layers of clear sheet material, each coated with a transparent conductive coating, and forming the resulting laminate into lenses, mounting the lenses in glasses frames, and providing a means in association with the transparent conductive coatings on the layers of clear sheet material of the lenses for establishing an electrostatic field in one lens and then the other in alternating relationship, the field being effective to align liquid crystals in the droplets substantially with the direction in which the light from the image travels through the lens, in the "ON" or clear state of the lens, and the lenses being cloudy and translucent and obscuring vision in the "OFF" state which occurs in alternation with the "ON" state in absence of an electrostatic field.

* * * * *